United States Patent
Mathias (10) Patent No.: US 7,330,855 B2
(45) Date of Patent: Feb. 12, 2008

(54) CONVERTING DATA BETWEEN A FRONT END SCHEMA NODE AND A BACK END SCHEMA NODE

(75) Inventor: Razvan Mathias, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 11/136,876

(22) Filed: May 25, 2005

(65) Prior Publication Data

US 2006/0271566 A1 Nov. 30, 2006

(51) Int. Cl.
G06F 7/00 (2006.01)
G06F 17/00 (2006.01)
G06F 17/30 (2006.01)

(52) U.S. Cl. .............. 707/102; 707/100; 707/101; 707/103 R; 707/201

(58) Field of Classification Search ............ 707/3, 707/100, 102, 103 R, 201, 101
See application file for complete search history.

(56) References Cited

U.S. PATENT DOCUMENTS

| | | | | |
|---|---|---|---|---|
| 5,873,093 | A * | 2/1999 | Williamson et al. | 707/103 R |
| 5,893,107 | A * | 4/1999 | Chan et al. | 707/103 R |
| 6,122,641 | A * | 9/2000 | Williamson et al. | 707/103 R |
| 6,393,434 | B1 * | 5/2002 | Huang et al. | 707/200 |
| 2001/0034733 | A1 * | 10/2001 | Prompt et al. | 707/102 |
| 2002/0107838 | A1 * | 8/2002 | Tsai | 707/3 |
| 2003/0088654 | A1 * | 5/2003 | Good et al. | 709/223 |
| 2003/0105770 | A1 * | 6/2003 | MacLeod et al. | 707/103 R |
| 2005/0149543 | A1 * | 7/2005 | Cohen et al. | 707/100 |
| 2006/0155722 | A1 * | 7/2006 | Sengupta | 707/100 |
| 2006/0184568 | A1 * | 8/2006 | Barcia | 707/103 R |
| 2006/0277224 | A1 * | 12/2006 | Aftab et al. | 707/201 |

OTHER PUBLICATIONS

Microsoft, IProperty Interface, Apr. 15, 1992, Microsoft Corporation, Revision 106, pp. 1-14.*
Sun Microsystems, Serializable Objects, Jan. 11, 2001, pp. 1-3<http://web.archive.org/web/20010111065700/http://java.sun.com/products/jndi/tutorial/objects/storing/serial.html>.*
Robichaux, Paul., Making Exchange ActiveSync Work, Apr. 1, 2005, ProQuest Computing, Exchange & Outlook Administrator, Apr. 2005, pp. 4-8.*
APPLE, Sync music, podcasts and photos to go, http://www.apple.com/itunes/sync.html, Jul. 20, 2005, 2 pp, Apple Computer, Inc., United States.

(Continued)

Primary Examiner—Pierre Vital
Assistant Examiner—Christopher P Nofal
(74) Attorney, Agent, or Firm—Senniger Powers (57) ABSTRACT

Automatically converting data between different schemas. A client request to read data from a front end schema node to a back end schema node is received. The nodes may be constructed according to different schemas, whereby a front end data object and a back end data object are created with a common interface and a common set of property types for wrapping around respective front end and back end data objects. The data is then read from the front end schema node to the back end schema node via the front end data object and the back end data object according to the common interface and the common set of property types. A SchemaState Object provides a listing of property pairs for constructing the front end and back end data objects, each with at least one property from the listing of property pairs.

16 Claims, 4 Drawing Sheets

OTHER PUBLICATIONS

BLACKBERRY, *Corporate Data Access*, http://www.blackberry.com/products/service/cda.shtml, Jul. 22, 2005, 2 pp, Research In Motion, Ltd.

Good Technology, Inc., GoodAccess™, http://www.good.com/index.php/products_good_access.html, Jul. 22, 2005, 2 pp., Good Technology, Inc., United States.

Good Technology, Inc., GoodLink™ Wireless Messaging, http://www.good.com/index.php/products_wireless_email.html, Jul. 22, 2005, 2 pp., Good Technology, Inc., United States.

MICROSOFT, *About Devices*, http://msdn.microsoft.com/library/default.asp?url=/library/en-us/wmplay10/mmp_sdk/aboutdevices.asp, Jul. 20, 2005, 1 pg., Microsoft Corporation, United States.

MICROSOFT, *About Partnerships*, http://msdn.microsoft.com/library/default.asp?url=/library/en-us/wmplay10/mmp_sdk/aboutpartnerships.asp, Jul. 20, 2005, 1 pg., Microsoft Corporation, United States.

MICROSOFT, *About the Synchronization Engine*, http://msdn.microsoft.com/library/default.asp?url=/library/en-us/wmplay10/mmp_sdk/aboutdevicesynchronization.asp, Jul. 20, 2005, 1 pg., Microsoft Corporation, United States.

MICROSOFT, *About Playlist Synchronization*, http://msdn.microsoft.com/library/default.asp?url=/library/en-us/wmplay10/mmp_sdk/aboutplaylistsynchronization.asp, Jul. 20, 2005, 2 pp., Microsoft Corporation, United States.

\* cited by examiner

FIG. 2

| AirSync property | XSO property |
|---|---|
| AirSyncStringProperty("Subject") | XSOStringProperty(SubjectPropertyDefinition) |
| AirSyncStringProperty("Body") | XSOStringProperty(BodyPropertyDefinition) |
| AirSyncSensitivityProperty("Sensitivity") | XSOSensitivityProperty(SensitivityPropertyDefn) |
| AirSyncStringProperty("To") | XSORecipientProperty(RecipientPropertyDefn("To")) |

CONVERTING DATA BETWEEN A FRONT END SCHEMA NODE AND A BACK END SCHEMA NODE

TECHNICAL FIELD

Embodiments of the present invention relate to the field of automatically communicating and converting property data between different schemas. In particular, embodiments of this invention relate to methods, computer-readable media, and data structures capable of converting property data between differing back end and front end schemas by surrounding the schemas with data objects sharing a common interface.

BACKGROUND OF THE INVENTION

With the increasing prevalence of portable and mobile computing devices, the importance of data conversion (i.e., synchronization) between two or more of such devices becomes paramount. Clients expect to be able to access and manipulate the same data stores on more than one device. In the wireless area, for example, many conventional wireless PIM (Personal Information Manager) synchronization products have difficulty converting PIM items from a back end (e.g., server) schema to a different front end (e.g., device) schema. This is at least partially due to the lack of available conversions between the back end schema and the front end schema. Common back end server schemas include DAV (Distributed Authoring and Versioning) extensions to the Hypertext Transfer Protocol (HTTP), Messaging Application Programming Interface (MAPI), Multipurpose Internet Mail Extensions (MIME), Exchange Server Objects (XSO), Outlook Object Model/MAPI, Microsoft Hotmail protocol, among others. Common front end schemas include, for example, AirSync, extensible markup language (XML), MIME, and other various conventional web services.

Examples of conventional conversion products include ActiveSync, Mobile Information Server, and Exchange ActiveSync, all by Microsoft Corporation of Redmond, Wash. Overcoming this conversion problem conventionally requires writing new conversion code for each new schema, because conventional systems lack a common framework to support schema conversion. Such code revision solutions require that both the back end and the front end products have the schema conversion development done independently of one another, by hand, which can be time consuming and expensive. Such individual redevelopment for each new schema is undesirable. Conventional systems also attempt to address these problems with XML Schema Definition (XSD) schema transformations. The problem inherent with XSD schemas is that they cannot represent complex data transformations (e.g. from a formatted text property to a compressed binary format), as they do not have actual code doing the data conversion. Furthermore, XSDs are limited to transformations between text protocols (e.g. from one XML format to another) rather than, for example, from text protocol to back-end API.

Unfortunately, these issues are not adequately addressed by any conventional system. Accordingly, a solution that improves conversion and data reading between two different schemas by employing a general, light-weight, extensible, and efficient system for working with mismatched schemas is desirable.

SUMMARY OF THE INVENTION

Accordingly, a method (or a computer-readable media or a data structure) for automatically converting between a back end schema node and a front end schema node according to a client request via a common, extensible interface is desired to address one or more of these and other disadvantages. Advantageously, at least one embodiment of the present invention allows for conversion of data of different schemas without rewriting the programming code to allow for interaction between the schemas. In addition, rather than drafting new code for each new schema encountered, at least one embodiment of the invention provides an extensible table requiring the simple addition of a new row or column associating the properties of the new schema with the properties of existing schemas. Generally, aspects of the invention permit receiving a request from a client to read data from a front end schema node; constructing a front end data object surrounding the front end schema node requested by the client to be read; creating a back end schema node for receiving data from the front end schema node; constructing a back end data object, the back end data object and the front end data object sharing a common interface and a common set of property types; binding, or wrapping, the back end schema node to the back end data object; and performing an operation on the data from the front end schema node via the front end data object and the back end data object. For example, embodiments of the invention may be well-suited for collaboration by a group of clients, each utilizing separate devices, on one large, shared document.

In one aspect of the invention, a method for converting data from a front end schema node according to a client request is disclosed. The method comprises receiving a request from a client to read data from a front end schema node and constructing a front end data object surrounding the front end schema node requested by the client to be read. The method further comprises creating a back end schema node for receiving data from the front end schema node and constructing a back end data object. The back end data object and the front end data object share a common interface and a common set of property types. The method further comprises binding, or wrapping the back end schema node to the back end data object and performing an operation on the data from the front end schema node via the front end data object and the back end data object.

In another aspect of the invention, a schema conversion system for automatically converting between a back end schema node and a front end schema node according to a client request is disclosed. The system comprises a SchemaState Object comprising a listing of property pairs. Each of the property pairs comprises a back end property associated with the back end schema node and a front end property associated with the front end schema node. A front end data object surrounds the front end schema node. The SchemaState Object constructs the front end data object with at least one front end property from the listing of property pairs. A back end data object surrounds the back end schema node. The SchemaState Object constructs the back end data object with at least one back end property from the listing of property pairs. The at least one back end property corresponds to the at least one front end property.

In yet another aspect of the invention, a method of converting data is disclosed. The method comprises receiving a client request to read data from a front end schema node to a back end schema node. The front end schema node is constructed according to a first schema and the back end schema node is constructed according to a second schema.

The method further creates a front end data object and a back end data object. The front end data object and the back end data object share a common interface and a common set of property types. The method further wraps the front end schema node with the front end data object and wraps the back end schema node with the back end data object. The method further reads the data from the front end schema node to the back end schema node via the front end data object and the back end data object according to the common interface and the common set of property types.

In still another aspect of the invention, a computer-readable medium with computer executable instructions for receiving, constructing, creating, constructing, binding, and performing generally as set forth above with respect to the method and system of the present invention is disclosed.

Alternatively, the invention may comprise various other methods, computer-readable media, systems, and data structures.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Schema Conversion System

Figure 1:
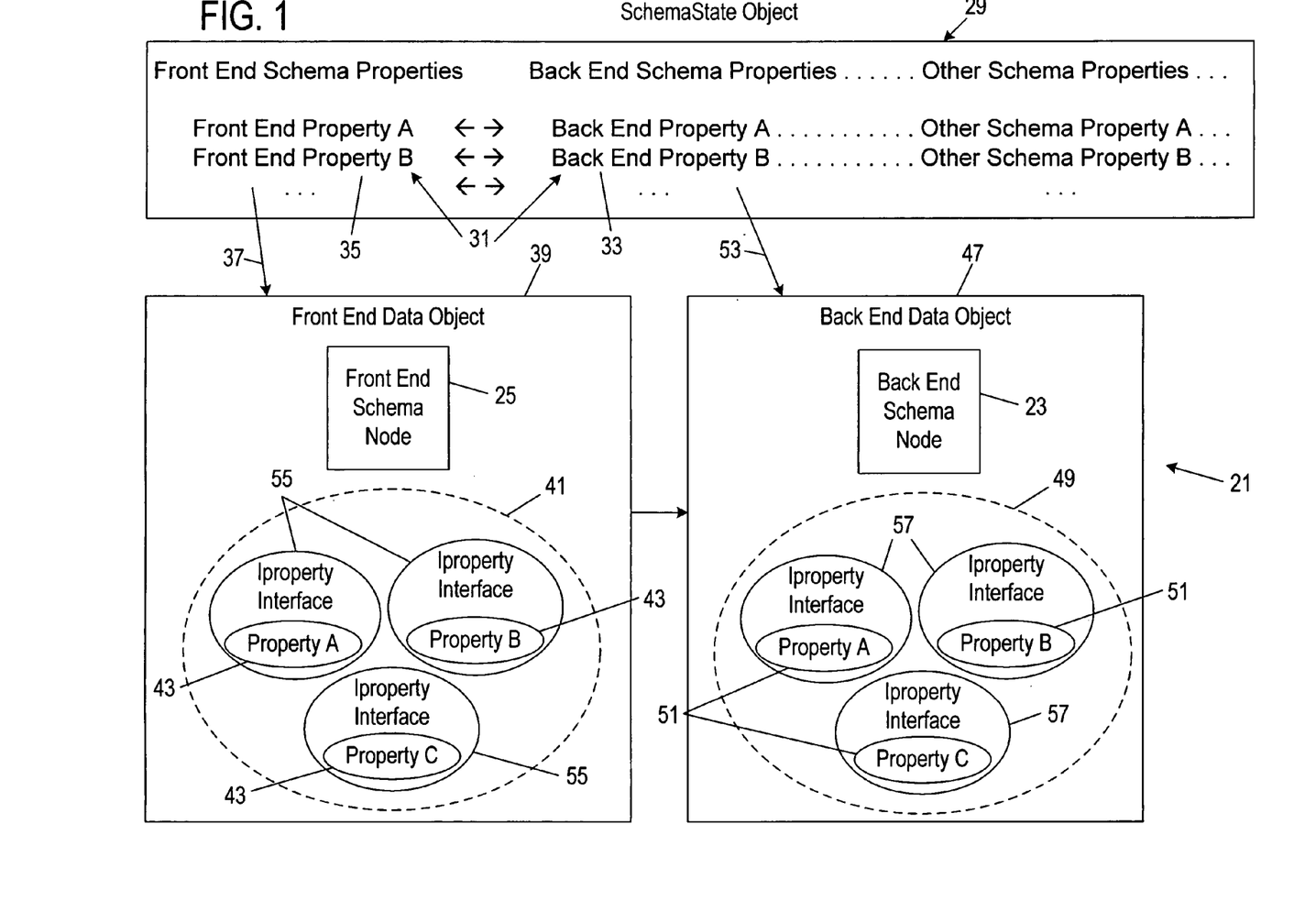
FIG. 1 is a diagram of a system of the present invention.

Referring now to FIG. 1, a diagram depicting a schema conversion system, generally indicated 21, for automatically converting between a back end schema node 23 and a front end schema node 25 according to a client request of the present invention is shown. Generally speaking, the front end schema node 25 contains information data sought to be read to the back end schema node 23. The details of this system 21 are discussed in detail herein, and will be referred to throughout the following discussion. The system 21 generally comprises a SchemaState Object, generally indicated 29, comprising a listing of property pairs, generally indicated 31. The SchemaState Object 29 is a code object that houses the link between the source and destination schemas, here the back end schema node 23 and the front end schema node 25. Each of the property pairs 31 comprises a back end property 33 associated with the back end schema node 23 and a front end property 35 associated with the front end schema node 25. In the example depicted in FIG. 1, Front End Property A and Back End Property A comprise a property pair. Similarly, Front End Property B and Back End Property B comprise a property pair. Any number of additional property pairs 31 may be included without departing from the scope of the claimed invention.

In one example, the listing of property pairs 31 is extensible. Thus, expanding the set of property pairs 31 being converted from one schema to another is readily achievable where the property pairs have a predetermined type. In particular, the property types may also be dynamically extensible, whereby property type behaviors are abstracted in such a way that new type behaviors can be added as Dynamic Link Libraries (DLLs).

In one example, the SchemaState Object 29 is constructed by a client. Such construction may occur in any number of ways. For instance, a client may establish the starting and ending schemas 23,25 and further define properties associated with each of the schemas. Because the present system is extensible, adding additional schemas and properties presents little problem for the client. In another example, the front end schema node 25 is an AirSync object and the back end schema node 23 is an Exchange Server Object (XSO). As will be explained in greater detail below, other schema types may be readily added to the SchemaState Object 29.

In another example, the front end schema node 25 is adapted to be read-only, and the back end schema node 23 is adapted to be mutable. This arrangement is particularly useful if the goal of the client is to only read data from the front end schema node 25 to the back end schema node 23. In yet another example, the front end schema node 25 is in XML, which may be incongruous with the language of the back end schema node, without the techniques of the present invention.

The system 21 further comprises a front end data object 39 surrounding the front end schema node 25. The front end data object 39 additionally comprises a property container 41 for containing front end properties 43. The SchemaState Object 29 constructs at 37 the front end data object 39 with at least one front end property 43 from the listing of property pairs 31 within the SchemaState Object.

The system further comprises a back end data object 47 surrounding the back end schema node 23. The back end data object 47 may also comprise a property container 49 for containing back end properties 51. The SchemaState Object 29 constructs at 53 the back end data object 47 with at least one back end property 51 from the listing of property pairs 31 within the SchemaState Object. In this manner, the back end properties 51 corresponds to the front end properties 43.

Each of the front end properties 43 may additionally be wrapped in a front end IProperty interface 55, and each of the back end properties 51 may additionally be wrapped in a back end IProperty interface 57. The IProperty interfaces 55,57 are adapted to be sent between the data objects 39,47 to perform an operation on the data from the front end schema node 25. Because the back end schema node 23 and the front end schema node 25 are completely decoupled in the architecture, the system 21 is relatively straightforward, enabling ready implementation of many schema applications on the single platform of the present invention. For example, a conversion application embodying the present invention will have the ability to reuse the front end data object 39 to convert between various front end schema nodes 25 and back end schema nodes 23. Moreover, decoupling the front end schema node 25 and the back end schema node 23 provides for relatively easy protocol upgrades because only the underlying properties need to be changed, not the interface.

Figure 2:
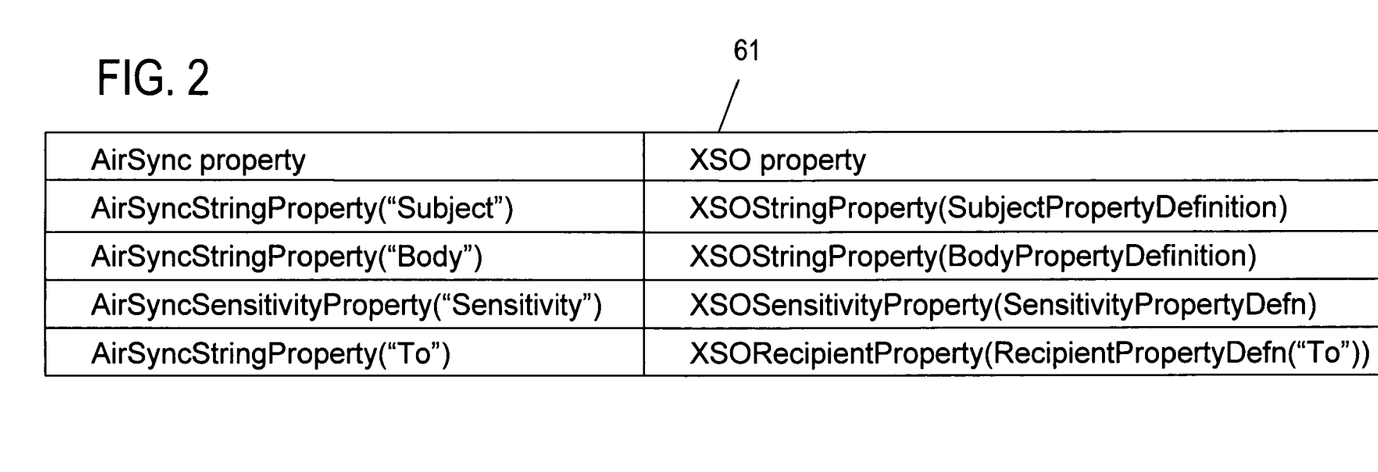
FIG. 2 is a tabular listing of exemplary property pairs.

In another example, the listing of property pairs 31 is in tabular form, such as shown with table 61 of FIG. 2. In the example shown, each column comprises a particular schema (e.g., Air Sync or XSO), while each row comprises a particular property (e.g., subject property, body property, etc.). The rows and columns may be switched without departing from the scope of the claimed invention. Table-driven conversion from one schema to another is particularly useful because code maintenance requires reduced effort, namely only identification of properties requiring conversion and the code performing the conversion. Thus, addition of new schemas is relatively simple and such addition is common to all schemas. In another example, the tabular listing of property pairs is serialized, whereby a property mapping may be saved to a file for a later retrieval.

For the examples of FIGS. 1 and 2, AirsyncStringPropety derives from IStringProperty, which derives from IProperty XSOStringProperty, which derives from IStringProperty, which derives from IProperty. In this particular example, the IProperty is required at the root in order to ensure that all properties in any single column in FIG. 1 (e.g., front end schema properties and back end schema properties) are of the same type/interface, namely, the IProperty interface. Similarly, the IStringPropety is required so that all properties in the same row have the same type. Moreover, the IString-Property is the interface that allows reading one string property (e.g. an AirSync string property) to another string property (e.g. an XSO string property).

Method for Converting Data

Figure 3:
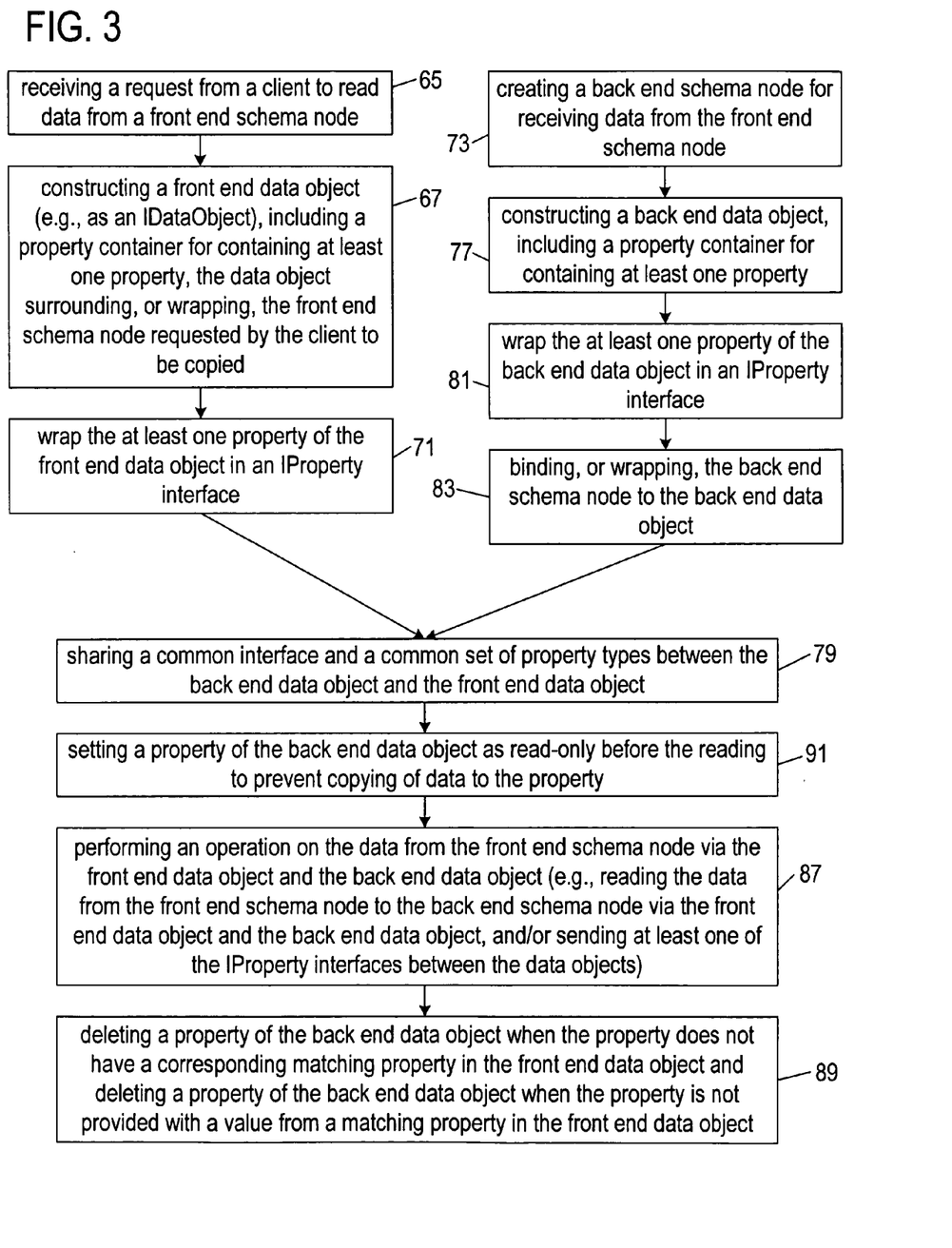
FIG. 3 is a flowchart of a method of the present invention.

Referring now to FIGS. 1 and 3, a method for automatically manipulating data from a front end schema node 25 according to a client request is disclosed. The method comprises receiving, at 65, a request from a client to read data from a front end schema node 25. The method further comprises constructing, at 67, a front end data object 39 surrounding the front end schema node 25 requested by the client to be read. In one example, constructing the front end data object 39 comprises constructing, also at 67, a property container 41 for containing at least one property 43. The at least one property of the property container 41 may be any number of property types, including a string property, a floating point number property, an integer property, among others. Such constructed properties 43 of the front end data object 39 may comprise a contact name property, an address property, an e-mail address property, a telephone number property, a calendar property, a data property, a time property, and a time zone property, among others.

The method may further wrap, at 71, the at least one property 43 of the front end data object 39 in an IProperty interface 55. In another example, the method may further construct the front end data object as an IDataObject, at 67. As discussed below, only the IProperty interfaces 55,57 themselves are being sent between data objects 39,47 during the schema conversion.

The method further comprises creating, at 73, a back end schema node 23 for receiving data from the front end schema node 25. The method further comprises constructing, at 77, a back end data object 47. The back end data object 47 and the front end data object 39 share a common interface and a common set of property types at 79. In one example, constructing the back end data object 47 comprises constructing, also at 77, a property container 49 for containing at least one property 51. As with the properties 43 of the front end data object 39, the at least one property 51 of the back end data object 47 may also be any number of property types, including a string property, a floating point number property, an integer property, among others. Such constructed properties 51 of the back end data object 47 may comprise a contact name property, an address property, an e-mail address property, a telephone number property, a calendar property, a data property, a time property, and a time zone property, among others.

The method may further wrap, at 81, the at least one property 51 of the back end data object 47 in an IProperty interface 57. In yet another example, the method may further construct the back end data object 47 as an IDataObject, at 77. The method may further comprise binding, at 83, the back end schema node 23 to the back end data object 47.

The method also comprises performing, at 87, an operation on the data from the front end schema node 25 via the front end data object 39 and the back end data object 47. In one example, the performing an operation comprises reading, also at 87, the data from the front end schema node 25 to the back end schema node 23 via the front end data object 39 and the back end data object 47. In one example, the reading comprises using a single CopyFrom() operation. In another example, performing an operation on the data further comprises sending, also at 87, at least one of the IProperty interfaces 55,57 between the data objects 39,47. It is important to note that only the IProperty interfaces 55,57 are being sent between the data objects, not the objects 39,47 themselves. In particular, the process avoids creating a third, intermediate copy of the data. Instead, the data is read directly from the front end schema node 25 and written directly to the back end schema node 23 via the front end data object 39 and the back end data object 47. This distinction is important for performance reasons. Again, at no point in the reading or sending processes are copies of original properties 43,51 created. Only the interfaces 55,57 are exchanged.

The method may also comprise deleting, at 89, a property 51 of the back end data object 47 when the property does not have a corresponding matching property 43 in the front end data object 39. This deletion ensures that the back end data object 47 has no properties 51 not included in the front end data object 39. In another example, the method may further comprise deleting, also at 89, a property 51 of the back end data object 47 when the property is not provided with a value from a matching property 43 in the front end data object 39. In still another example, the method may comprise setting, at 91, a property 51 of the back end data object 47 as read-only before the reading at 87 to prevent copying of data to the property. Other deleting and setting techniques are also contemplated as within the scope of the claimed invention.

In yet another method of the present invention, a method of converting data comprises receiving, at 65, a client request to read data from a front end schema node 25 to a back end schema node 23. The front end schema node 25 is constructed according to a first schema, and the back end schema node 23 is constructed according to a second schema. The method further creates, at 67, a front end data object 39 and a back end data object 47. The front end data object 39 and the back end data object 47 share, at 79, a common interface and a common set of property types. In particular, the method wraps, at 67, the front end schema node 25 with the front end data object 39 and wraps, at 83, the back end schema node 23 with the back end data object 47. The method further contemplates reading, at 87, the data from the front end schema node 25 to the back end schema node 23 via the front end data object 39 and the back end data object 47 according to the common interface and the common set of property types.

Code Example I

The following code example demonstrates an exemplary code for reading data according to the present invention (e.g., CopyFrom()):

```
/// <summary>
/// When this object is the source of a CopyFrom( ), this method is
```

```
    /// called by the destination to let the source know where it is being
    /// copied to. This allows for the implementation of source policies
    /// that depend on destination properties.
    /// </summary>
    /// <param name="dstPropertyContainer">The container we are being copied into</param>void CopyFrom(IDataObject srcObject)
    {
        srcObject->SetCopyDestination(this);
        foreach (IProperty srcProperty in srcObject)
        {
            IProperty dstProperty =
            GetPropertyBySchemaLinkId(srcProperty);
            dstProperty->CopyFrom(srcProperty);
        }
    }
}
```

It should be noted here that for efficiency, this is not implemented on the IProperty level, but rather on the IPropertyContainer level, as each property must be contained within some property container.

Code Example II

The following code example demonstrates an exemplary schema converter from a client's perspective:

```
// Retrieve an XmlDocument from WBXLML
//
XmlDocument xmlDoc = new XmlDocument( );
xmlDoc.LoadXml(this.txtInput.Text);
// Create a schema with which to interpret the data
//
IAirSyncVersionFactory airSyncVersionFactory =
AirSyncProtocolVersionParserBuilder.FromString("2.5");
    SchemaState schemaState = airSyncVersionFactory.CreateCalendarSchema( );
    // Set the option to truncate bodies. Also set the global max string size option to 1024.
    //
    Hashtable options = new Hashtable( );
    options["BodyTruncation"] = true;
    options["MaxStringSize"] = 1024;
    // Create an AirSync data object to wrap our raw Xml node
    //
    AirSyncDataObject airSyncObject1 =
schemaState.CreateAirSyncDataObject(options);
    airSyncObject1.Bind(xmlDoc.DocumentElement);
    // Create an XSO object to recieve the converted properties
    //
    XsoDataObject xsoDataObject = schemaState.CreateXsoDataObject( );
    // Create the item store and a fresh XSO item to play with
    //
    IItemId itemId = null;
    using (IItem xsoItem =
itemStore.CreateCalendarItem(itemStore.GetDefaultFolderId(DefaultFolder.Calendar)))
    {
        // Bind our wrapper to the XSO item
        //
        xsoDataObject.Bind(xsoItem);
        // Convert the AirSync object to an XSO object
        //
        xsoDataObject.CopyFrom(airSyncObject1);
        // Save the XSO object to the back-end
        //
        xsoItem.Save( );
        // Save the item id and throw away the item
        //
        itemId = xsoItem.Id;
    }
        // Serialize the schema to a memory stream and
        // deserialize it back before converting from XSO->AirSync
        //
        MemoryStream stream = new MemoryStream(1024 * 2);
        schemaState.Serialize(stream);
        stream.Seek(0, SeekOrigin.Begin);
        schemaState = SchemaState.Deserialize(stream);
        // Convert the item back to AirSync and verify using the
        // serialized schema
        //
        XmlDocument newXmlDoc = new XmlDocument( );
        using (IItem xsoItem = itemStore.GetItem(itemId))
        {
            XsoDataObject xsoDataObject2 = schemaState.CreateXsoDataObject( );
            xsoDataObject2.Bind(xsoItem);
            // Create a new node into which we will convert the item
            //
```

```
            newXmlDoc.AppendChild(newXmlDoc.CreateElement("NewObject"));
            // Unbind the data object from the current Xml node and rebind it to
a new output node
            //
            airSyncObject1.Unbind( );
            airSyncObject1.Bind(newXmlDoc.ChildNodes[0]);
            airSyncObject1.CopyFrom(xsoDataObject2);
        }
```

General Purpose Computing Device

Figure 4:
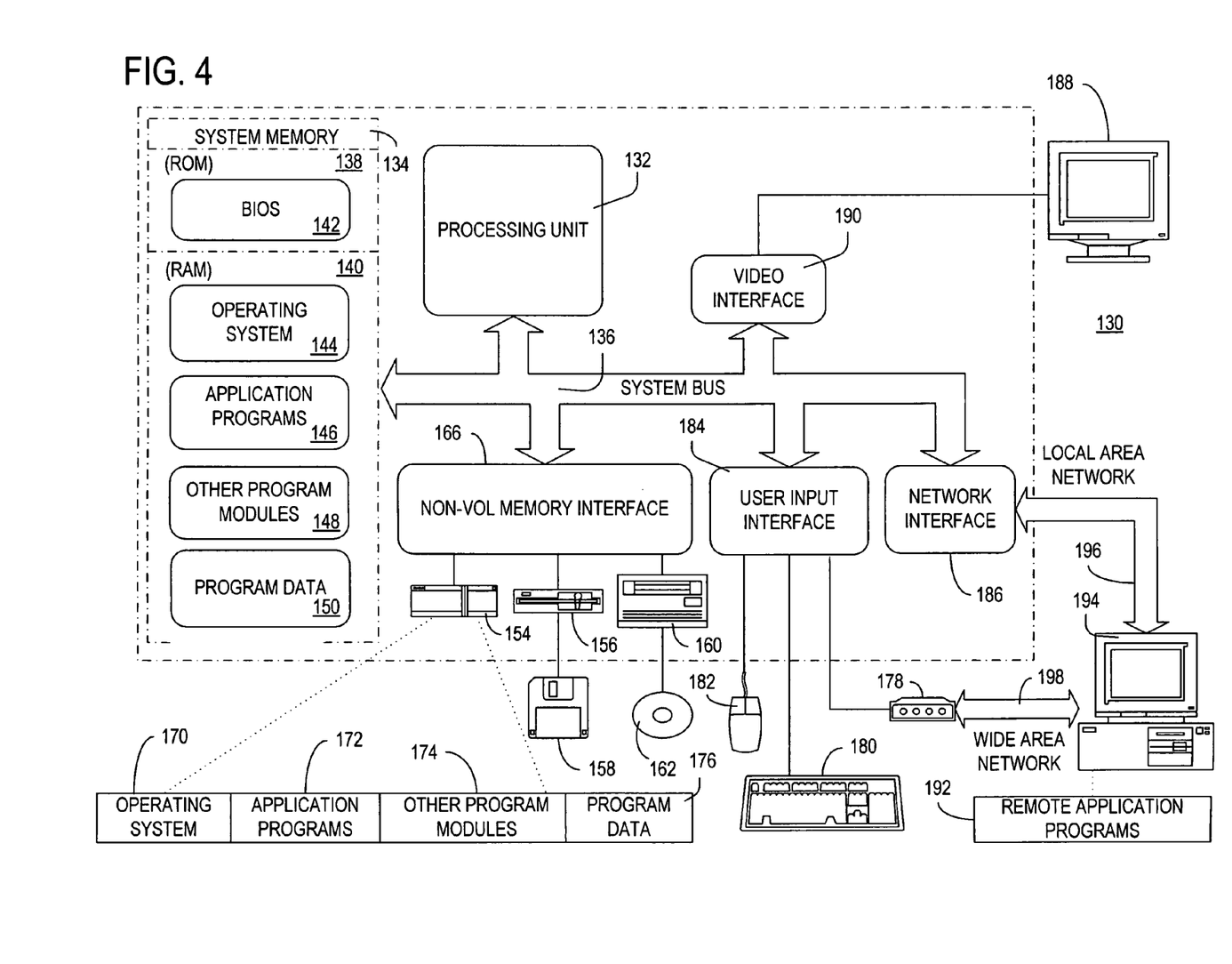
FIG. 4 is a block diagram illustrating one example of a suitable computing system environment in which the invention may be implemented.

FIG. 4 shows one example of a general purpose computing device in the form of a computer 130. In one embodiment of the invention, a computer such as the computer 130 is suitable for use in the other figures illustrated and described herein. In one example, the client computer or device discussed above may be embodied by computer 130. Computer 130 additionally has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. In one example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read-only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 4 illustrates operating system 144, application programs 146, other program modules 148, and program data 150.

The computer 130 may also include other removable/non-removable, volatile/nonvolatile computer storage media. In one example, FIG. 4 illustrates a hard disk drive 154 that reads from or writes to non-removable, nonvolatile magnetic media. FIG. 4 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 4, provide storage of computer readable instructions, data structures, program modules and other data for the computer 130. In FIG. 4, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A client may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, camera, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown)

such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 4 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 4 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, in one example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the operations described below in conjunction with a microprocessor or other data processor.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, a computer 130 acting as the system 21 executes a method such as described above for converting data from a front end schema node according to a client request. The computer 130 or its components receiving a request from a client to copy data from a front end schema node. The computer 130 or its components constructing a front end data object surrounding the front end schema node requested by the client to be copied. The computer 130 or its components creating back end schema node for receiving data from said front end schema node. The computer 130 or its components constructing a back end data object, whereby the back end data object and the front end data object share a common interface and a common set of property types. The computer 130 or its components bind the back end schema node to the back end data object. The computer 130 or its components perform an operation on the data from the front end schema node via the front end data object and the back end data object.

Also in operation, a computer 130 acting as the system 21 executes a method such as described above for converting data. The computer 130 or its components receive a client request to read data from a front end schema node to a back end schema node. The front end schema node is constructed according to a first schema and the back end schema node is constructed according to a second schema. The computer 130 or its components creating a front end data object and a back end data object, whereby the front end data object and the back end data object share a common interface and a common set of property types. The computer 130 or its components wrapping the front end schema node with the front end data object and wrapping the back end schema node with the back end data object. The computer 130 or its components reading the data from the front end schema node to the back end schema node via the front end data object and the back end data object according to the common interface and the common set of property types.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A computer-implemented method for converting data from a front end schema node to a back end schema node according to a client request, said method comprising:

receiving a request from a client to read data from a front end schema node;

constructing a front end data object, said front end data object surrounding the front end schema node requested by the client to be read, wherein constructing the front end data object comprises constructing a property container for containing at least one property of the front end data object;

wrapping said at least one property of said front end data object in an IProperty interface;

constructing a back end data object, wherein constructing the back end data object comprises constructin a property container for containing at least one property of the back end data object, said back end data object and said front end data object sharing a common interface and a common set of property types;

wrapping said at least one property of said back end data object in an IProperty interface;

creating a back end schema node for receiving data from said front end schema node;

binding the back end schema node to the back end data object; and sending at least one of said IProperty interfaces between said front end and back end data objects to convert the data from the front end schema node to the back end schema node via the front end data object and the back end data object for reading the data from the front end schema node.

2. The method of claim 1 wherein said at least one property of the front end data object comprises at least one of a string property, a floating point number property, and an integer property, and wherein said at least one property of the back end data object comprises at least one of a string property, a floating point number property, and an integer property.

3. The method of claim 1 wherein said at least one property of the front end data object comprises at least one of a contact name property, an address property, an e-mail address property, a telephone number property, a calendar property, a data property, a time property, and a time zone property.

4. The method of claim 1 further comprising constructing the front end data object as an IDataObject; and constructing the back end data object as an IDataObject.

5. The method of claim 1 further comprising deleting a property of said back end data object when said property does not have a corresponding matching property in said front end data object.

6. The method of claim 5 further comprising deleting a property of said back end data object when said property is not provided with a value from a matching property in said front end data object.

7. The method of Aaim claim 1 further comprising setting a property of said back end data object as read-only before said reading to prevent copying of data to said property.

8. A computerized schema conversion system for converting between a back end schema node and a front end schema node according to a client request, said system comprising a processor and memory configured with instructions for:

a SchemaState Object comprising a listing of property pairs, each of said property pairs comprising a back end property associated with the back end schema node and a front end property associated with the front end schema node;

a front end data object surrounding the front end schema node, said SchemaState Object constructing the front end data object with at least one front end property from the listing of property pairs, said at least one front end property being wrapped in an IProperty interface; and a back end data object surrounding the back end schema node, said SchemaState Object constructing the back end data object with at least one back end property from the listing of property pairs, said at least one back end property corresponding to said at least one front end property and being wrapped in a corresponding IProperty interface, said IProperty interfaces being adapted to be sent between said front end and back end data objects, and wherein the front end schema node is converted to the back end schema node by sending at least one of said IProperty interfaces between said front end and back end data objects to read the front end schema node.

9. The system of claim 8 wherein said front end schema node is an AirSync object and said back end schema node is an Exchange Server Object (XSO).

10. The system of claim 8 wherein said front end schema node is adapted to be read-only and said back end schema node is adapted to be mutable.

11. The system of claim 8 wherein said front end schema node is in extensible markup language (XML).

12. The system of claim 8 wherein said listing of property pairs is extensible.

13. The system of claim 8 wherein said listing of property pairs is in tabular form, whereby one of the rows and the columns comprises the formats and the other of the rows and the columns comprises the properties.

14. The system of claim 13 wherein said tabular listing of property pairs is serialized.

15. The system of claim 8 wherein said SchemaState Object is constructed by said client.

16. A computer-implemented method of converting data from a front end schema node to a back end schema node according to a client request, said method comprising:

receiving a client request to read data from a front end schema node to a back end schema node, said front end schema node being constructed according to a first schema and said back end schema node being constructed according to a second schema;

creating a front end data object and a back end data object, said front end data object and said back end data object sharing a common interface and a common set of property types, wherein creating the front end data object and the back end data object comprises constructing a property container for containing at least one property of the respective data objects;

wrapping the front end schema node with the front end data object wherein at least one front end property is wrapped in an IProperty interface;

wrapping the back end schema node with the back end data object wherein at least one back end property is wrapped in a corresponding IProperty interface, said IProperty interfaces being adapted to be sent between said data objects; and reading the data from the front end schema node to the back end schema node via the front end data object and the back end data object according to the common interface and the common set of property types, said reading converting the data from the first schema to the second schema.

* * * * *

UNITED STATES PATENT AND TRADEMARK OFFICE
CERTIFICATE OF CORRECTION

| | | |
|---|---|---|
| PATENT NO. | : 7,330,855 B2 | |
| APPLICATION NO. | : 11/136876 | |
| DATED | : February 12, 2008 | |
| INVENTOR(S) | : Razvan Mathias | |

It is certified that error appears in the above-identified patent and that said Letters Patent is hereby corrected as shown below:

In column 13, line 10, in Claim 1, delete "constructin" and insert -- constructing --, therefor.

In column 13, line 51, in Claim 7, after "method of" delete "Aaim".

Signed and Sealed this
Twenty-second Day of February, 2011

David J. Kappos
*Director of the United States Patent and Trademark Office*